US008846795B2

(12) United States Patent
Tabata et al.

(10) Patent No.: US 8,846,795 B2
(45) Date of Patent: Sep. 30, 2014

(54) METHOD FOR PRODUCING POLYMER MOLDED ARTICLE, AND POLYMER MOLDED ARTICLE

(75) Inventors: Hironori Tabata, Hirakata (JP); Akira Nakasuga, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/877,905

(22) PCT Filed: Dec. 14, 2011

(86) PCT No.: PCT/JP2011/078936
§ 371 (c)(1),
(2), (4) Date: Apr. 4, 2013

(87) PCT Pub. No.: WO2012/096091
PCT Pub. Date: Jul. 19, 2012

(65) Prior Publication Data
US 2013/0190440 A1    Jul. 25, 2013

(30) Foreign Application Priority Data

Jan. 13, 2011 (JP) .................. 2011-004521
Jan. 18, 2011 (JP) .................. 2011-008108
May 25, 2011 (JP) .................. 2011-116684
Jul. 26, 2011 (JP) .................. 2011-163017
Jul. 27, 2011 (JP) .................. 2011-164423

(51) Int. Cl.
| C08K 3/00 | (2006.01) |
| C08F 210/00 | (2006.01) |
| B05D 7/02 | (2006.01) |
| C08J 7/02 | (2006.01) |
| C08K 3/18 | (2006.01) |

(52) U.S. Cl.
CPC ... C08K 3/18 (2013.01); B05D 7/02 (2013.01); C08J 7/02 (2013.01); *C08J 2323/02* (2013.01); *C08J 2323/10* (2013.01)
USPC ......................................... 524/424; 526/348

(58) Field of Classification Search
CPC ............ C08K 3/18; B05D 7/02; C08F 110/06
USPC ....................................... 524/424
See application file for complete search history.

(56) References Cited

U.S. PATENT DOCUMENTS

| 5,037,928 A | 8/1991 | Li et al. |
| 2009/0215975 A1* | 8/2009 | Sakurai et al. ................ 526/351 |
| 2010/0082101 A1 | 4/2010 | Muratoglu et al. |
| 2012/0100376 A1* | 4/2012 | Sakaguchi et al. ............ 428/407 |

FOREIGN PATENT DOCUMENTS

| JP | 61-246230 A | 11/1986 |
| JP | 62-256803 A | 11/1987 |
| JP | 4-502024 A | 4/1992 |
| JP | 7-300530 A | 11/1995 |
| JP | 07300530 A | * 11/1995 ................. C08J 3/00 |
| JP | 2000-128993 A | 5/2000 |
| JP | 2008-37102 A | 2/2008 |
| JP | 2009-504897 A | 2/2009 |

OTHER PUBLICATIONS

Written Opinion of the International Searching Authority (PCT/ISA/237) for the Application No. PCT/JP2011/078936 mailed Jul. 25, 2013.
International Search Report for the Application No. PCT/JP2011/078936 mailed Mar. 6, 2012.
Written Opinion of the International Searching Authority (PCT/ISA/237) for the Application No. PCT/JP2011/078936 mailed Mar. 6, 2012.

* cited by examiner

*Primary Examiner* — Hui Chin
(74) *Attorney, Agent, or Firm* — Cheng Law Group, PLLC

(57) ABSTRACT

Provided are a method for producing a polymer molded article, which is capable of increasing crystallinity, heat resistance, and isotropic elastic modulus while maintaining the original shape of a polymer molded body and a polymer molded article obtained by the method and having a high crystallinity, high heat resistance, and a high isotropic elastic modulus. The method for producing a polymer molded article includes the steps of: preparing a polymer material mainly containing a crystalline polymer; and impregnating the polymer material with a first gas having solubility in the crystalline polymer in an atmosphere in which the pressure of the first gas is equal to or higher than atmospheric pressure at a temperature higher than (Tm−30)° C. but lower than (Tm−15)° C., where Tm represents the melting point of the crystalline polymer, to obtain a polymer molded article. The polymer molded article is obtained by such a production method.

10 Claims, No Drawings

METHOD FOR PRODUCING POLYMER MOLDED ARTICLE, AND POLYMER MOLDED ARTICLE

TECHNICAL FIELD

The present invention relates to a method for producing a polymer molded article, and a polymer molded article. More specifically, the present invention relates to a method for producing a polymer molded article having a high crystallinity, high heat resistance, and a high isotropic elastic modulus and a polymer molded article.

BACKGROUND ART

General-purpose resins such as polypropylene and polyethylene are very inexpensive and can foe easily molded. Therefore, such general-purpose resins are widely used in various kinds of fields.

However, such general-purpose resins have a problem that heat resistance is low. Therefore, it is difficult to apply such general-purpose resins to electric and electronic parts or automotive parts required to have heat resistance.

Patent Document 1 discloses a method for crystallizing a polymer resin including: exposing a crystalline polymer resin in a molten state to a pressurized atmosphere of a gas having solubility in the polymer resin to dissolve the gas in the resin; and cooling the resin in the pressurized atmosphere of the gas to solidify the resin. According to this method, it is possible to provide a polymer material and a molded article which have an improved crystallinity and improved heat resistance.

PRIOR ART DOCUMENTS

Patent Documents

Patent Document 1: JP 2000-128993 A

SUMMARY OF THE INVENTION

Problems to be Solved by the Invention

However, in the method for crystallizing a polymer resin, described in Patent Document 1, the crystalline polymer resin is heated to a molten state, and therefore the shape of a molded article is changed. For this reason, there is a problem that the crystallization method described in Patent Document 1 cannot be applied to the production of a polymer molded article having a complicated shape.

In addition, in order to maintain the shape of a polymer molded article made of such a general-purpose resin as described above, especially the shape of a polymer molded article having a complicated shape during the production, of the polymer molded article, there is a strong demand for a method for increasing the elastic modulus of the polymer molded article.

It is therefore an object of the present invention to provide a method for producing a polymer molded article, which is capable of increasing crystallinity, heat resistance, and isotropic elastic modulus while maintaining the original shape of a polymer molded body and a polymer molded article obtained by the method and having a high crystallinity, high heat resistance, and a high isotropic elastic modulus.

Means for Solving the Problems

The present invention is directed to a method for producing a polymer molded article including the steps of: preparing a polymer material mainly containing a crystalline polymer; and impregnating the polymer material with a first gas having solubility in the crystalline polymer in an atmosphere in which the pressure of the first gas is equal to or higher than atmospheric pressure at a temperature higher than $(Tm-30)°$ C. but lower than $(Tm-15)°$ C., where Tm represents the melting point of the crystalline polymer, to obtain a polymer molded article.

According to a specific aspect of the method for producing a polymer molded article of the present invention, in the impregnation step, after impregnated with the first gas, the polymer material is further impregnated with a second gas having solubility in the crystalline polymer in an atmosphere in which the pressure of the second gas is equal to or higher than atmospheric pressure at a temperature higher by 5° C. or more than the temperature during the impregnation with the first gas but equal to or lower than $(Tm-10)°$ C. to obtain a polymer molded article. In this case, it is possible to further increase the crystallinity and heat resistance of the resulting polymer molded article.

According to another specific aspect of the method for producing a polymer molded article of the present invention, the first gas and the second gas are the same. In this case, it is possible to reduce the number of gases used in the present invention and to simplify the step performed in the present invention.

According to another specific aspect of the method for producing a polymer molded article of the present invention, the step of cooling the polymer molded article is further provided after the impregnation step. In this case, it is possible to promote the crystallization of an amorphous portion of the crystalline polymer plasticized in the impregnation step. Therefore, it is possible to further increase the heat resistance of the resulting polymer molded article.

According to another specific aspect of the method for producing a polymer molded article of the present invention, the crystalline polymer is a polyolefin. In this case, it is possible to reduce the production cost of the polymer molded article due to the use of a general-purpose polyolefin. More preferably, the polyolefin is polypropylene. In this case, it is possible to further increase the heat resistance of the resulting polymer molded article because polypropylene is one of polyolefins having high heat resistance.

The present invention is also directed to a polymer molded article obtained by the production method according to the present invention. The polymer molded article has an increased crystallinity and an increased melting point. Therefore, according to the present invention, it is possible to obtain a polymer molded article having higher heat resistance than the original polymer material. More preferably, the melting point of the polymer molded article is higher by 10° C. or more than the Tm temperature of the original material.

The present invention is also directed to a polymer molded article including polypropylene as a main component and having a melting point of 173° C. or higher and an isotropic elastic modulus of 2 GPa or higher. The polymer molded article preferably has a melting point of 175° C. or higher. The polymer molded article preferably has an isotropic elastic modulus of 2.5 GPa or higher.

Effects of the Invention

According to the method for producing a polymer molded article of the present invention, a polymer material mainly containing a crystalline polymer is impregnated with a gas having solubility in the crystalline polymer in an atmosphere in which the pressure of the gas is equal to or higher than atmospheric pressure at a temperature higher than the melting point of the crystalline polymer −30° C., which makes it possible to increase the crystallinity of the resulting polymer molded article. This also makes it possible to increase the melting point and isotropic elastic modulus of the resulting polymer molded article.

Further, according to the production method of the present invention, the polymer material is impregnated with the gas at a temperature lower than the melting point of the crystalline polymer −15° C., and therefore the shape of a polymer molded body is hardly changed. Therefore, according to the present invention, it is possible, even when a polymer molded body such as a product having a complicated three-dimensional shape is used, to increase the crystallinity, heat resistance, and isotropic elastic modulus of the resulting polymer molded article while maintaining the original shape of the polymer molded body.

Further, the polymer molded article according to the present invention can be obtained by the production method according to the present invention, and therefore it is possible to provide a polymer molded article having a high crystallinity, high heat resistance, and a high isotropic elastic modulus.

EMBODIMENTS OF THE INVENTION

Hereinbelow, the present invention will be described in detail.

Polymer Material

In a method for producing a polymer molded article according to the present invention, a polymer material mainly containing a crystalline polymer is first prepared. In the present invention, the crystalline polymer refers to a polymer having a crystalline region, in which polymer molecules are regularly aligned, and a melting point.

The crystalline polymer is not particularly limited, and various thermoplastic resins such as a polyolefin (e.g., polypropylene, polyethylene, an ethylene-α-olein copolymer), polyvinyl chloride, polystyrene, a polyamide, a polycarbonate, a saturated polyester, and a polymethacrylic acid ester can be used. Among them, a general-purpose polyolefin that is inexpensive and easily available is preferably used. More preferably, polypropylene having heat resistance can be used as the polyolefin.

The polymer material is not particularly limited as long as it mainly contains the crystalline polymer. As the polymer material, for example, a molded body obtained by injection molding or by rolling or pressing after extraction molding can be used. It is to be noted that the polymer material may contain, in addition to the crystalline polymer, additives such as a plasticizer and a filler.

Impregnation Step

The method for producing a polymer molded article according to the present invention includes the step of impregnating the polymer material with a first gas having solubility in the crystalline polymer to obtain a polymer molded article. The impregnation is performed in an atmosphere in which the pressure of the first gas is equal to or higher than atmospheric pressure at a temperature higher than (Tm−30)° C. but lower than (Tm−15)° C., where Tm represents the melting point of the crystalline polymer.

In the present invention, since the polymer material is impregnated with the first gas at a temperature higher than (Tm−30)° C. but lower than (Tm−15)° C., an amorphous portion of the crystalline polymer in the polymer material can be plasticized by the first gas without changing the shape of the polymer material. The crystallization of the plasticized amorphous portion is promoted in a subsequent cooling step. Therefore, it is possible to increase the crystallinity of the resulting polymer molded article without changing the original shape of the polymer material, that is, it is possible to obtain a polymer molded article having an increased crystallinity and the same shape as the original shape of the polymer material. Therefore, it is possible to increase the melting point and elastic modulus of the resulting polymer molded article.

If the temperature during the impregnation with the first gas is (Tm−30)° C. or lower, there is a case where the plasticizing effect of the first gas cannot be sufficiently obtained. In this case, there is a possibility that the melting point of the resulting polymer molded article cannot be sufficiently increased.

Further, when a second impregnation step in which the polymer material is further impregnated with a second gas described later is performed, if the temperature during a first impregnation step in which the polymer material is impregnated with a first gas is (Tm−15)° C. or higher, there is a case where a highly crystalline portion of the crystalline polymer is plasticized in the first impregnation step and the second impregnation step. In this case, there is a possibility that the effect of increasing the melting point of the resulting polymer molded article is insufficient and is therefore similar to that obtained by conventional impregnation performed at a crystal melting temperature.

It is to be noted that in the present invention, the melting point and crystallinity of each of the crystalline polymer and the polymer molded article are determined based on a peak temperature obtained by DSC measurement. In the present invention, the elastic modulus of each of the crystalline polymer and the polymer molded article is a tensile storage elastic modulus at 23° C. measured by dynamic viscoelastic measurement.

In the production method according to the present invention, the polymer material is preferably impregnated with the first gas in every direction of the polymer material. This makes it possible to increase the elastic modulus of the resulting polymer molded article in every direction. That is, the elastic modulus of the polymer molded article increased by the present invention has excellent isotropy.

When the pressure of the first gas during the impregnation is increased, the amount of the first gas dissolved in the amorphous portion is increased so that a plasticizing effect is enhanced. If the pressure of the first gas during the impregnation is lower than 1 MPa, there is a case where the plasticizing effect of the first gas cannot be sufficiently obtained and therefore the melting point of the resulting polymer molded article cannot be sufficiently increased. For this reason, the pressure of the first gas during the impregnation is preferably 1 MPa or higher. More preferably, it is 2 MPa or higher. Even more preferably, it is 3 MPa or higher.

In the above-described impregnation step of the method for producing a polymer molded article according to the present invention, a second impregnation step may foe performed after a first impregnation step in which the polymer material is impregnated with a first gas. The second impregnation step is performed by further impregnating the polymer material with a second gas in an atmosphere in which the pressure of the second gas is equal to or higher than atmospheric pressure at a temperature higher by 5° C. or more than that during the first impregnation step but equal to or lower than (Tm−10)° C. This makes it possible to plasticize part of the amorphous portion of the polymer material in the second impregnation step, which has not been plasticized in the first impregnation step. Therefore, it is also possible to efficiently plasticize part of the amorphous portion requiring heat treatment at higher temperature for plasticization. Therefore, the crystallinity of the resulting polymer molded article can be further increased by crystallizing the plasticized amorphous portion in a subsequent cooling step. This also makes it possible to further increase the melting point of the resulting polymer molded article.

If the temperature during the impregnation with the second gas is lower than the temperature during the impregnation with the first gas +5° C., there is a case where the effect of plasticizing part of the amorphous portion, which has not been plasticized in the first impregnation step, cannot be sufficiently obtained. In this case, there is a possibility that the melting point of the resulting polymer molded article cannot be sufficiently increased. On the other hand, if the impregnation temperature exceeds (Tm−10)° C., there is a case where a highly crystalline portion of the crystalline polymer is plasticized. In this case, there is a possibility that the effect of increasing the melting point of the resulting polymer molded article is insufficient and is therefore similar to that obtained by the conventional impregnation method performed at the crystal melting temperature. For this reason, the temperature during the impregnation in the second impregnation step is preferably a temperature higher by 5° C. or more than the temperature during the impregnation with the first gas but equal to or lower than (Tm−10)° C.

When the pressure of the second gas during the impregnation step is increased, the amount of the second gas dissolved in the amorphous portion is increased so that a plasticizing effect is enhanced. If the pressure of the second gas during the impregnation is lower than atmospheric pressure, there is a case where the plasticizing effect of the second gas cannot be sufficiently obtained, and therefore the melting point of the resulting polymer molded article cannot be sufficiently increased. For this reason, the pressure of the second gas in the second impregnation step is preferably equal to or higher than atmospheric pressure.

If the pressure of the second gas during the impregnation is lower than 1 MPa, there is a case where the plasticizing effect of the second gas cannot be sufficiently obtained, and therefore the melting point of the resulting polymer molded article cannot be sufficiently increased. For this reason, the pressure of the second gas during the impregnation is preferably 1 MPa or higher. More preferably, it is 2 MPa or higher. Even more preferably, it is 3 MPa or higher.

It is to be noted that the pressure of the first gas during the impregnation in the first impregnation step and the pressure of the second gas during the impregnation in the second impregnation step may be the same or different from each other.

The first gas and the second gas are not particularly limited as long as their solubility in the crystalline polymer used is not zero, but preferably have high solubility in the crystalline polymer. As the first gas and the second gas have higher solubility in the crystalline polymer, the amorphous portion of the crystalline polymer can be more effectively crystallized so that the resulting polymer molded article has a higher crystallinity. The first gas and the second gas can be selected from carbon dioxide, nitrogen gas, neon, argon, and the like in consideration of solubility in the crystalline polymer used, etc. The first and second gases used are preferably the same. This makes it possible to reduce the number of gases used in the impregnation step and to simplify the impregnation step. When the crystalline polymer used is, for example, polypropylene, carbon dioxide or nitrogen gas is preferably used as the first and second gases.

It is to be noted that each of the first and second gases may be a single gas or a mixed gas composed of two or more gases. When the first or second gas is a mixed gas, as long as at least one gas contained in the mixed gas has solubility in the crystalline polymer, the other one or more gases contained in the mixed gas do not need to have solubility in the crystalline polymer.

An apparatus used in the impregnation step is not particularly limited, and the impregnation may be performed in, for example, a pressure vessel. In this case, the pressure in the pressure vessel may be reduced after the polymer material is enclosed within the pressure vessel at ordinary temperature and pressure. Then, the pressure vessel is heated until the temperature in the pressure vessel reaches the above-described temperature, and the first gas is enclosed within the pressure vessel at a pressure equal to or higher than atmospheric pressure so that the polymer material can be impregnated with the first gas.

Further, the impregnation with the first gas and the impregnation with the second, gas are preferably continuously performed in the same apparatus. This makes it possible to simplify the impregnation step. When these impregnation steps are performed in a pressure vessel, the polymer material may be impregnated with the first gas by the above-described method and then further impregnated with the second gas by heating the pressure vessel until the temperature in the pressure vessel reaches a temperature suitable for the second impregnation step.

Cooling Step

In the method for producing a polymer molded article according to the present invention, the obtained polymer molded article is preferably cooled after the impregnation step. This makes it possible to promote the crystallization of the amorphous portion plasticized in the impregnation step. Therefore, the crystallinity of the polymer molded article is increased so that the melting point of the polymer molded article is increased.

The obtained polymer molded article is preferably cooled without reducing the pressure, that is, preferably cooled in a state where the pressure during the above-described impregnation step is maintained. If the pressure in the above-described apparatus is reduced before the cooling step, there is a case where the obtained polymer molded article is foamed.

It is to be noted that a cooling method and a cooling temperature are not particularly limited as long as crystallization can be promoted. The cooling may be performed by, for example, leaving the polymer molded article getting cool to room temperature.

Alternatively, the cooling may be performed by cooling the polymer molded article to a temperature within its crystallization temperature range, keeping it at the temperature for a certain period of time, and then cooling in to room temperature. In this case, the crystallinity of the polymer molded article can be further increased, and therefore the melting point of the polymer molded article can be further increased. The time during which the polymer molded article is maintained at the temperature is preferably 30 minutes or longer.

It is to be noted that the crystallization temperature range refers to the temperature range from, the temperature at which a DSC curve in a DSC chart measured by differential scanning calorimetry (DSC) is separated from a base line to the temperature at which the DSC curve again returns to the base line. The above-described temperature is preferably in the range of ±10° C. of the peak temperature of the DSC curve in the crystallization temperature range of the polymer molded article.

The polymer molded article according to the present invention is obtained by the above-described method for producing a polymer molded article according to the present invention, and therefore has an increased crystallinity. Therefore, the polymer molded article according to the present invention has an increased melting point and an increased elastic modulus.

Depending on the type of polymer material constituting the polymer molded article, the melting point of the polymer molded article is preferably higher by 10° C. or more than that of the polymer material not impregnated with a gas. For example, when the polymer molded article is mainly made of polypropylene, the melting point of the polymer molded article is preferably 173° C. or higher, more preferably 175° C. or higher.

Depending on the type of polymer material constituting the polymer molded article, the elastic modulus of the polymer molded article is preferably higher by 0.5 GPa or more than that of the polymer material not impregnated with a gas. For example, when the polymer molded article is mainly made of polypropylene, the elastic modulus of the polymer molded article is preferably 2 GPa or higher, more preferably 2.5 GPa or higher, even more preferably 3 GPa or higher.

Further, in the production method according to the present invention, as described above, the polymer material is preferably impregnated with the first gas from every direction around the polymer material. In this case, the elastic modulus of the polymer molded article according to the present invention is increased not in only a certain direction but in every direction of the polymer molded article. That is, the isotropic elastic modulus of the polymer molded article according to the present invention is further increased.

Hereinbelow, the present invention will be made more apparent with reference to specific examples and comparative examples of the present invention. It is to be noted that the present invention is not limited to the following examples.

Example 1

First, a polypropylene resin injection-molded body (manufactured by Japan Polypropylene Corporation, polypropylene resin grade: MA3H, melting point: 170° C., peak temperature in DSC curve: 125° C.) was enclosed within a pressure vessel at ordinary temperature and pressure, and the pressure in the pressure vessel was reduced by a vacuum pump for 1 hour. Then, the pressure vessel was heated until the temperature in the pressure vessel reached 145° C. Then, carbon dioxide was enclosed within the pressure vessel so that the pressure in the pressure vessel was 14 MPa, and the pressure and temperature in the pressure vessel were maintained for 3 hours.

Then, the pressure vessel was cooled to ordinary temperature at a rate of 0.5° C./min. Then, carbon dioxide was leaked to return the pressure in the pressure vessel to ordinary pressure. Then, the thus obtained polymer molded article was taken out of the pressure vessel.

Example 2

A polymer molded article was obtained in the same manner as in Example 1 except that the heating temperature was 150° C.

Example 3

A polymer molded article was obtained in the same manner as in Example 1 except that the heating temperature was 150° C. and the pressure in the pressure vessel was 3.4 MPa.

Example 4

A polymer molded article was obtained in the same manner as in Example 1 except that the heating temperature was 150° C. and the pressure in the pressure vessel was 1.4 MPa.

Example 5

Production of a polymer molded article was performed in the same manner as in Example 2 up to the step of maintaining the temperature and pressure in the pressure vessel at 150° C. and 14 MPa for 3 hours.

Then, the pressure vessel was cooled to 120° C. at a rate of 0.5° C./min and then maintained at 120° C. for 3 hours. Then, the pressure vessel was cooled to ordinary temperature at a rate of 0.5° C./min. Then, carbon dioxide was leaked to return the pressure in the pressure vessel to ordinary pressure. Then, the thus obtained polymer molded article was taken out of the pressure vessel.

Comparative Example 1

The above-described polypropylene resin injection-molded body used in Example 1 was prepared as Comparative Example 1.

Comparative Example 2

A polymer molded article was obtained in the same manner as in Example 1 except that the heating temperature was 140° C.

Comparative Example 3

A polymer molded article was obtained in the same manner as in Example 1 except that the heating temperature was 155° C. and the pressure in the pressure vessel was 6 MPa.

Evaluation of Examples and Comparative Examples

1) Crystallinity and Melting Point

The crystallinity and melting point of each of the polypropylene resin injection-molded body of Comparative Example 1 and the polymer molded articles obtained in Examples 1 to 5 and Comparative Examples 2 and 3 were measured in accordance with JIS K 7122. More specifically, each of the polymer molded articles and the polypropylene resin injection-molded body was placed in a container of a heat-flux differential scanning calorimetry instrument ("DSC6220" manufactured by SII Nanotechnology Inc.) and heated to 200° C. by the instrument to perform DSC (Differential Scanning Calorimetry) measurement.

The crystallinity of each of the polymer molded articles and the polypropylene resin injection-molded body was calculated by determining a peak area of a DSC curve obtained by the above measurement and dividing the peak area by 209 mJ/mg and multiplying the result by 100. Further, a melting temperature was determined from a melting peak observed in the DSC curve and regarded as the melting point of the polymer molded article or of the polypropylene resin injection-molded body.

The thus determined crystallinity and melting point of each of the polymer molded articles and the polypropylene resin injection-molded body are shown in the following Table 1.

2) Elastic Modulus

The elastic modulus of each of the polymer molded articles obtained in Examples 1 to 5 and Comparative Examples 2 and 3 and the polypropylene resin injection-molded body of Comparative Example 1 was measured in the following manner. As a measuring instrument, DVA-200 manufactured by IT Keisoku Seigyo K.K. was used to measure dynamic viscoelasticity under the following measurement conditions, and storage modulus at 25° C. was determined.

Measurement Conditions Measurement Mode: tensile
Measurement Temperature Range: 25 to 200° C.
Temperature Rise Rate: 5° C./min
Frequency: 10 Hz The thus determined elastic modulus of each of the polymer molded articles and the polypropylene resin injection-molded body is shown in the following Table 1, it is to be noted that the polymer molded article obtained in Comparative Example 3 was greatly changed in shape, and therefore its elastic modulus could not be measured.

3) Shape Change

Each of the polymer molded articles obtained in Examples 1 to 5 and Comparative Examples 2 and 3 was visually observed to determine whether a shape change had occurred. The results are shown in the following Table 1.

TABLE 1

|  | Crystallinity (%) | Melting Point (° C.) | Elastic Modulus (GPa) | Shape Change |
|---|---|---|---|---|
| Ex. 1 | 65 | 176.2 | 3.6 | Not Occurred |
| Ex. 2 | 65 | 179.9 | 4.1 | Not Occurred |
| Ex. 3 | 64 | 180.5 | 3.7 | Not Occurred |
| Ex. 4 | 55 | 173.3 | 2.5 | Not Occurred |
| Ex. 5 | 64 | 182.6 | 3.7 | Not Occurred |
| Comp. Ex. 1 | 47 | 167.7 | 1.7 | — |
| Comp. Ex. 2 | 61 | 170.9 | 2.1 | Not Occurred |
| Comp. Ex. 3 | 56 | 170.5 | Not Measurable | Occurred |

As can be seen from Table 1, the polymer molded articles of Examples 1 to 5 according to the present invention were significantly improved in crystallinity, melting point, and elastic modulus as compared to the polypropylene resin injection-molded body of Comparative Example 1 and the polymer molded articles of Comparative Examples 2 and 3. The reason for this is that the polypropylene resin injection-molded body was impregnated with carbon dioxide at a temperature higher than $(Tm-30)°$ C. but lower than $(Tm-15)°$ C., where Tm represents the melting point of the polypropylene resin injection-molded body. It is considered that by doing so, an amorphous portion of the polypropylene resin injection-molded body was effectively plasticized and crystallized.

Further, in the cases of the polymer molded articles of Examples 1 to 5 according to the present invention, no shape change of the molded body was observed. The reason for this is considered to be that the polypropylene resin injection-molded body was treated at a temperature lower than its melting point $-15°$ C.

Example 6

First, a polypropylene resin injection-molded body (manufactured by Japan Polypropylene Corporation, polypropylene resin grade: MA3H, melting point: 167° C.) was enclosed within a pressure vessel at ordinary temperature and pressure, and the pressure in the pressure vessel was reduced by a vacuum pump for 1 hour. Then, the pressure vessel was heated until the temperature in the pressure vessel reached 145° C. (first heating). Then, carbon dioxide was enclosed within the pressure vessel so that the pressure in the pressure vessel was 14 MPa, and the pressure and temperature in the pressure vessel were maintained for 3 hours. Then, the pressure vessel was heated until the temperature in the pressure vessel reached 155° C. (second heating). Then, the temperature and pressure in the pressure vessel were maintained for 2 hours. Then, the pressure vessel was cooled to ordinary temperature at a rate of 0.5° C./min. Then, carbon dioxide was leaked to return the pressure in the pressure vessel to ordinary pressure. Then, the thus obtained polymer molded article was taken out of the pressure vessel.

Example 7

A polymer molded article was obtained in the same manner as in Example 1 except that the temperature of the first heating was 145° C. and the temperature of the second heating was 153° C., Example 8

A polymer molded article was obtained in the same manner as in Example 1 except that the temperature of the first heating was 145° C. and the temperature of the second heating was 153° C. and the pressure during the second heating was 3.8 MPa.

Comparative Example 4

A polymer molded article was obtained in the same manner as in Example 1 except that the temperature of the first heating was 140° C. and the temperature of the second heating was 140° C.

Comparative Example 5

A polymer molded article was obtained in the same manner as in Example 1 except that the temperature of the first heating was 160° C. and the temperature of the second heating was 165° C.

Evaluation of Examples and Comparative Examples

The crystallinity and melting point of each of the polypropylene resin injection-molded body of Comparative Example 1 and the polymer molded articles obtained in Examples 6 to 8 and Comparative Examples 4 and 5 were measured in accordance with JIS K 7122. More specifically, each of the polymer molded articles and the polypropylene resin injection-molded body was placed in a container of a heat-flux differential scanning calorimetry instrument ("DSC6220" manufactured by SII Nanotechnology Inc.) and heated to 200° C. by the instrument to perform DSC (Differential Scanning Calorimetry) measurement.

The crystallinity of each of the polymer molded articles and the polypropylene resin injection-molded body was calculated by determining a peak area of a DSC curve obtained by the above measurement and dividing the peak area by 209 mJ/mg and multiplying the result by 100. Further, a melting temperature was determined from a melting peak observed in the DSC curve and regarded as the melting point of the polymer molded article or of the polypropylene resin injection-molded body.

The thus determined crystallinity and melting point of each of the polymer molded articles and the polypropylene resin injection-molded body are shown in the following Table 2.

TABLE 2

| | Crystallinity (%) | Melting Point (° C.) |
|---|---|---|
| Ex. 6 | 64 | 182.6 |
| Ex. 7 | 64 | 180.5 |
| Ex. 8 | 62.2 | 180 |
| Comp. Ex. 1 | 47 | 167.7 |
| Comp. Ex. 4 | 60 | 172.4 |
| Comp. Ex. 5 | 58 | 170.5 |

As can be seen from Table 2, the polymer molded articles of Examples 6 to 8 according to the present invention were significantly improved in melting point as compared to the polypropylene resin injection-molded body of Comparative Example 1 and the polymer molded articles of Comparative Examples 4 and 5. The reason for this is that the polypropylene resin injection-molded body was impregnated with carbon dioxide at the temperature of the first heating higher than (Tm−30)° C. but lower than (Tm−15)° C., where Tm represents the melting point of the polypropylene resin injection-molded body, and then further impregnated with carbon, dioxide at the temperature of the second heating higher by 5° C. or more than the temperature of the first heating but equal to or lower than (Tm−10)° C. It is considered that by doing so, an amorphous portion of the polypropylene resin injection-molded body was more effectively plasticized and crystallized.

The invention claimed is:

1. A method for producing a polymer molded article comprising the steps of:

preparing a polymer material mainly containing a crystalline polymer; and impregnating the polymer material with a first gas having solubility in the crystalline polymer in an atmosphere in which the pressure of the first gas is equal to or higher than atmospheric, pressure at a temperature higher than (Tm−30)° C. but lower than (Tm−15)° C., where Tm represents the melting point of the crystalline polymer, to obtain a polymer molded article, wherein in the impregnation step, after impregnated with the first gas, the polymer atmosphere in which the pressure of the second gas is equal to or higher than atmospheric pressure at a temperature higher by 5° C. or more than the temperature during, the impregnation with the first as but equal to or lower than (Tm−10)° C. to obtain a polymer molded article.

2. The method for producing a polymer molded article according to claim 1, wherein the first gas and the second gas are the same.

3. The method for producing a polymer molded article according to claim 1, further comprising, the step of cooling the polymer molded article, after the impregnation step.

4. The method for producing a polymer molded article according to claim 1, wherein the crystalline polymer is a polyolefin.

5. The method for producing a polymer molded article according to claim 4, wherein the polyolefin is polypropylene.

6. A polymer molded article obtained by the method for producing a polymer molded article according to claim 1.

7. The polymer molded article according to claim 6, which has a melting point higher by 10° C. or more than the Tm° C.

8. A polymer molded article obtained by the method for producing a polymer molded article according to claim 1, comprising, polypropylene as a main material and having a melting point of 173° C. or higher and an isotropic elastic modulus of 2 GPa or higher.

9. The polymer molded article according to claim 8, wherein the melting point is 175° C. or higher.

10. The polymer molded article according to claim 8, wherein the isotropic elastic modulus is 2.5 GPa or higher.

* * * * *